March 19, 1968     H. C. McDONALD     3,373,493

NAVIGATIONAL DEVICE

Filed April 19, 1965

INVENTOR.

HUGH C. McDONALD

BY *Elliott & Pastoriza*

ATTORNEYS

United States Patent Office 3,373,493
Patented Mar. 19, 1968

3,373,493
NAVIGATIONAL DEVICE
Hugh C. McDonald, Santa Monica, Calif., assignor to Melvin E. Lind, Santa Monica, Calif.
Continuation-in-part of application Ser. No. 190,677, Apr. 27, 1962. This application Apr. 19, 1965, Ser. No. 448,979
5 Claims. (Cl. 33—1)

ABSTRACT OF THE DISCLOSURE

A base plate mounts a map with a compass scale and hour scales for converting sun declination to time. A transparent disc thereon has parallel graduated lines and is rotatable to bring some line into substantial alignment with two map points for reading off the direction and distance between them. A further slidable and rotatable transparent plate carries a world map ruled with longitude lines and cooperates with a further rotatable disc like the first for determining location of the observer with the aid of a chronometer. The two dics can also be used to diagram a radio fix.

---

Figure 1:
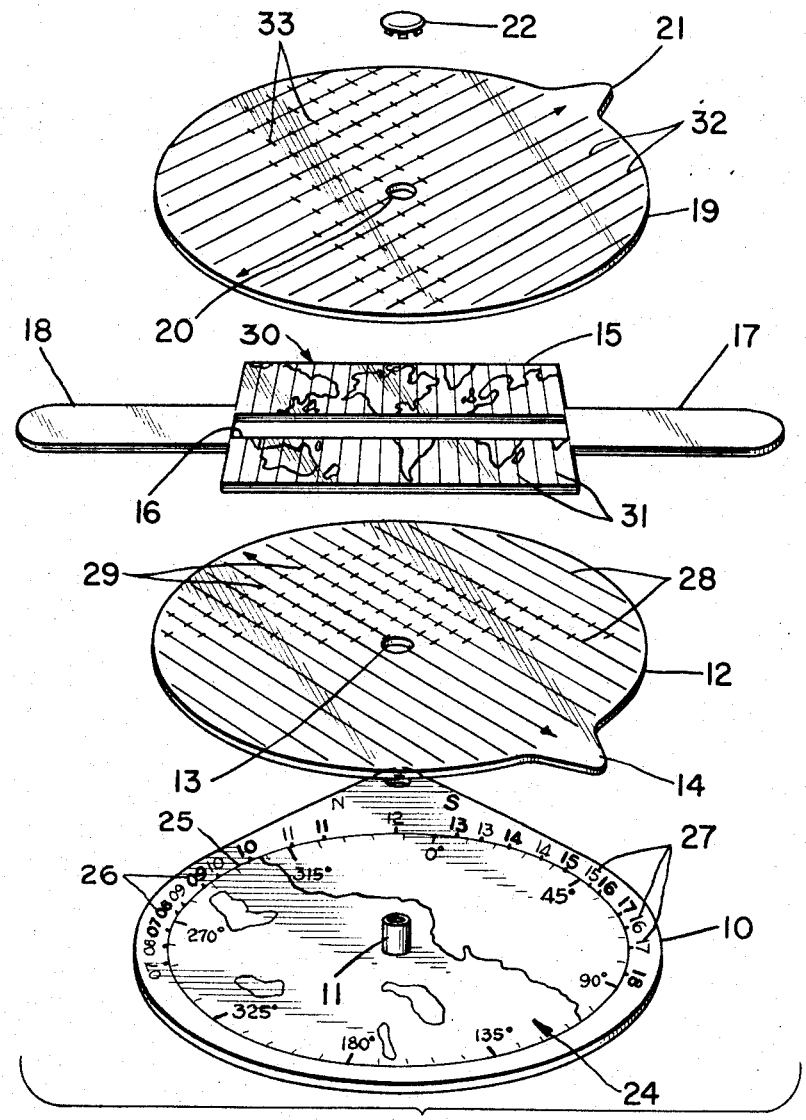

This application is a continuation-in-part of my co-pending application Ser. No. 190,677 filed Apr. 27, 1962, and entitled, Course and Distance Finding Device, now abandoned.

This invention relates generally to navigational devices and more particularly, to a novel course and distance finding device for use by boat and aircraft pilots and also to a navigational device which will enable a traveler to locate himself any place in the world.

Conventionally, the course and distance between two points on a chart is determined by a simple straight edge and protractor wherein a line is drawn between the two points and the heading or course measured by means of the protractor. This operation has been mechanized to some extent by providing specific equipment to facilitate the drawing of the course line and the maintaining of a reference line parallel to the drawn line in order that the true course may be read from a compass rose. In most instances, however, there are still required several steps in determining course and distance.

In addition to the foregoing, in both aircraft and ship navigation, the navigation charts provided are generally large and for convenient use require a relatively large flat surface upon which the chart may be spread. While no problem is generally presented on large ships because of the available room there is somewhat of a problem in proper handling of charts by aircraft pilots in view of the relatively cramped quarters involved. In addition, it is very difficult to solo fly an airplane and at the same time determine course and distances by conventional rule and compass methods.

In the case of very small boats, similar conditions exist, particularly when constant attention is necessary to operate the boat.

In addition to the foregoing, there has not been available any convenient and compact navigation device which will enable one to locate himself with respect to a world map as well as provide course and distance information.

With all of the foregoing in mind, it is accordingly a primary object of this invention to provide a novel navigational device in which the foregoing problems are overcome and which also includes means for providing the location of a person with respect to a world map.

More particularly, it is an object to provide a portable type device in which both the course and distance between two points may be readily determined by a single operation which may be effected with only one hand to the end that a rapid determination of course and distance can be realized without detracting from the pilot's principal function of either navigating a small boat or flying an aircraft.

Another object of the present invention is to provide a simple course and distance finding device which may be manufactured relatively inexpensively and which includes interchangeable parts so that specially prepared navigational charts may be substituted into the device to the end that great versatility is realized and yet a compact and portable configuration results.

Still another important object is to provide a device meeting the foregoing objects which includes means enabling the pilot to fix his position with respect to a world map as well as a local chart.

Briefly, these and many other objects and advantages of this invention are attained by providing a flat base member having a chart on at least one surface. This base member includes compass readings in degrees about its periphery so that the chart will be positioned within the compass readings with its true north in alignment with the true north on the compass readings.

A first transparent member including a first plurality of course lines, one of which passes through the center of the member, overlies the base member. A second transparent member preferably of rectangular shape in turn overlies the first member and includes an elongated slot. A third transparent member similar to the first transparent member and also having a second plurality of parallel lines thereon overlies the second member. A suitable means is provided to mount the first and third members to the base member for rotation, this means passing through the elongated slot in the second member to provide a guide so that the second member may slide as well as rotate between the first and third members.

The second member includes a world map having transverse parallel longitude lines properly oriented with respect to the world map. This second member is employed in conjunction with one of the rotating transparent members to enable a pilot or other person to locate himself on the world map. In this respect, the base member is provided with hour numerals indicating the time of day in given positions relative to those compass readings designating a corresponding azimuth angle of the sun.

With respect to finding course and distance with the foregoing device, one of the parallel lines may be approximately aligned with two points on the chart between which a trip is to be made by simply rotating one of the transparent members with respect to the chart. The true course between the points involved may then be read directly from the compass reading on the base member. In addition, the parallel lines on the transparent member may include evenly spaced divisions demarking given distance intervals corresponding to those on the chart so that the distance between the two points may be determined.

When employing the device to provide a person's location with respect to the world map on the second transparent member, either the first transparent member or the third transparent member may be rotated to align a parallel line passing through the center of the member with one of the compass readings corresponding to the measured aszimuth of the sun. The corresponding hour will then be immediately indicated providing the time of day. The pilot may then immediately compute his longitude knowing Greenwich time and this computed longitude enables him to then slide the second transparent member so that the corresponding longitude line thereon passes through the center of the rotatably mounted transparent members. Once the longitude has been determined and the second transparent member incorporating the world map properly positioned as described, it is then only necessary to determine the geographical position of the sun on the world map. From this position, the first or third transparent disc may be rotated to the point where one of the parallel lines thereof passes through this geographical position of the sun and this particular parallel line then followed up to the point where it intersects the longitude line, this intersection providing the location on the world map of the pilot.

A further means of providing fix is readily provided by the provision of the first and third transparent members each having a plurality of parallel lines thereon. Since these members are mounted for rotation relative to each other as well as with respect to the chart in the base member, any two of the lines may be aligned with radio stations and their intersection then used to determine a definite fix of the pilot's position on the chart.

Figure 2:
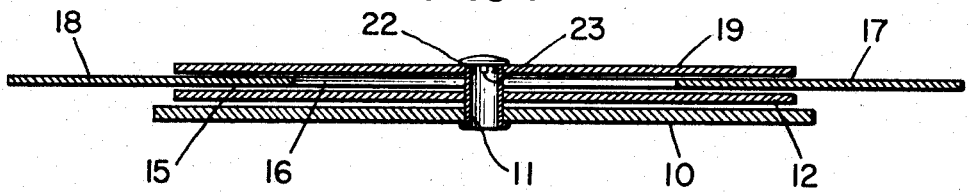

A better understanding of all of the foregoing as well as various other features and advantages of this invention will be had by now referring to a preferred embodiment thereof as illustrated in the accompanying drawings, in which:

FIGURE 1 is an exploded view illustrating the basic structural components making up the navigation device of this invention; and, FIGURE 2 is a cross-section of the elements of FIGURE 1 in assembled condition.

Referring first to FIGURE 1, the navigational device comprises a base member 10 having a central shaft 11 for rotatably mounting a first transparent member 12 of disc shape thereover. As shown, the first transparent member includes a central opening 13 adapted to be received over the shaft 11 and also includes a peripheral tab 14 to facilitate manual rotation of the member relative to the base member 10.

A second transparent member 15 preferably of rectangular shape is arranged to overlie the first transparent member 12. This second transparent member includes an elongated slot 16 running parallel to one of the long sides of the rectangular shape and additionally includes extended strip portions 17 and 18 to provide an overall length of the second member greater than the diameter of the first transparent member 12.

A third transparent member 19 in the form of a disc is arranged to overlie the second transparent member 15. As in the case of the first transparent member 10, the third transparent member 19 includes a central opening 20 and a peripheral tab 21. A resilient snap socket structure 22 is arranged to be received within the hollow end of the shaft 11 so that the various members may be mounted to the base member 10 by having the shaft 11 pass through the central openings 13 and 20 and through the elongated slot 16.

The foregoing assembled relationship will be clear by reference to FIGURE 2. It will be noted that the shaft 11 serves the dual function of first rotatably mounting the first and third members 12 and 19 and second, guiding for sliding movement the second transparent member 15 by being received through the slot 16 thereof.

Referring once again to FIGURE 1, there is provided on the top surface of the base member 10 a chart 24 in its central portion and compass readings 25 in degrees about the periphery with the north or zero degree reading corresponding to the direction of north on the chart 24.

Also included on the top surface of the base member 10 adjacent to its periphery are hour numerals indicating the time of day for various azimuth angles of the sun. The positioning of these hour numerals relative to the compass reading depends upon whether the declination of the sun is north or south of the equator. When the declination of the sun is north of the equator, then the hour numerals 26 are employed to indicate the time of day for a specific azimuth angle determined by the azimuth of the sun, whereas if the declination of the sun is south of the equator, the hour numerals 27 are employed. As a matter of convenience, the hour numerals may be disposed immediately adjacent to the compass readings in degrees defining the azimuth of the sun at that particular hour. Alternatively, the hour numerals may be disposed diametrically opposite to such compass readings.

Arranged to cooperate with the various indicia on the base 10 are a first plurality of parallel lines 28 formed on the first transparent member 12. Preferably one of these parallel lines passes diametrically through the center of the member 12 and preferably each of the lines includes division marks such as indicated at 29 corresponding to distance intervals on the chart 24 of the base 10.

The second transparent member 15 includes a world map 30 together with transverse parallel longitude lines 31 intersecting the world map at points in accord with the actual position of the longitude lines.

Finally, the third transparent member 19 is provided with a second plurality of straight parallel lines 32 also including distance division marks 33. As in the case of the first transparent disc member 12, the third transparent member 19 has one of its parallel lines passing diametrically through the center of the disc member.

In operation, and with the various transparent members assembled on the base member 10 as illustrated in FIGURE 2, assume that a pilot first wishes to locate himself on the world map 30. Assuming that he is not certain of the time of day, the first step is for the pilot to measure the azimuth angle of the sun. This may be accomplished by a simple compass. The operator will then rotate either the transparent member 12 or the transparent member 19 until the diametric straight line is opposite the degrees found for the sun's azimuth. At this point or at the diametrically opposite end of the line there will then be indicated the hour numeral corresponding to the time of day. The appropriate hour numeral will be selected depending upon whether the sun's declination is north or south of the equator. Knowing the time of day, and Greenwich time provided by the chronometer on his craft, the pilot may then very easily determine his longitude.

After the longitude has been determined, the pilot will slide the second transparent member 15 containing the world map by means of the tabs 17 and 18 to a position until the corresponding longitude line 30 is positioned to intersect the center of the base member 10. In this respect, the first or third transparent disc member 12 or 19 may be rotated to align its diametric center line in a north-south direction to correspond with the direction of the world map 30. With the map adjusted as described, the pilot will know that he is located on the world map in a position that falls along the diametric line of the transparent member 12 or 19, whichever one was used.

After the foregoing adjustments have been made, the operator then locates the geographical position of the sun on the world map 30. This geographical position is readily determinable from any suitable almanac by knowing the declination and Greenwich hour angle and the day, month, and year. With the one disc member held in position so that its diametric center line corresponds with the longitude line on the map 30, the pilot will rotate the other transparent disc until its center diametric line is aligned with the compass angle on scale 25 corresponding to the azimuth angle of the sun determining its geographic position. One of the parallel lines on this transparent disc that intersects this geographical position of the sun on the world map 30 is then located and the pilot may then simply follow this particular parallel line passing through the geographical position of the sun up to where it intersects the north-south line on the other transparent disc corresponding to the longitude line on the world map and the point where this intersection takes place will then precisely locate the pilot with respect to the world map.

After locating his position, a corresponding chart may be selected for use with the base member 10, and the pilot may then employ the disc 12 for example to locate his course and distance. For example, it is a simple matter to line up the diametric center parallel line with his compass reading so that he will immediately be advised of his course and then to select any other parallel line crossing the two points between which he wishes to know the distance. The number of division marks may then be counted to provide him with the distance between the two points.

With two sets of parallel lines which may be rotated relative to each other as well as the base member 10 and chart therein, the lines on each disc may be respectively aligned with spaced radio directions and then by following the appropriate lines to a point where they intersect, a precise fix of the pilot's location on the chart 24 is provided.

In conjunction with the foregoing, it should also be understood that since the longitude line may be very easily determined, it is only necessary to obtain one radio fix and then determine the point at which the corresponding parallel line on one of the disc members then aligned with the radio fix intersects the longitude line thereby providing an immediate fix of the pilot's position.

From the foregoing description, it will thus be evident that the present invention has provided a very simple, compact, and easily operable navigational device in which all of the various objects set forth may be fully realized.

What is claimed is:

1. A navigational device including, in combination: a base member; a first transparent member; a second transparent member; and means mounting said first member to said base member for rotation relative thereto, said means also mounting said second member to said base member for sliding movement relative thereto, said base member including compass readings in degrees about the peripheral portion of its surface and hour numerals indicating the time of day in given positions relative to those corresponding compass readings designating the azimuth angle of the sun, said first member having at least one diametric line across its surface, said second member having a world map thereon and transverse longitude lines oriented in accord with said world map, whereby the hour of the day may be determined from the azimuth angle of the sun by aligning said line on said first member with the compass reading corresponding to said azimuth angle and reading off the corresponding hour, and whereby the longitude may then be determined and said second member slid to a position in which its longitude line corresponding to the determined longitude intersects the center of said first member to thereby locate the longitude with respect to said world map.

2. A navigational device comprising, in combination: a base member; a first transparent member overlying said base member and including a central opening; a second transparent member overlying said first member and including an elongated slot; a third transparent member overlying said second member and including a central opening; and means passing through said central openings and elongated slot for mounting said first and third transparent members for rotation relative to said base member and said second transparent member for sliding movement between said first and third transparent members, said first and third transparent members being disc shaped and including respectively a peripheral tab to facilitate rotation thereof, said second transparent member being of a rectangular shape with said elongated slot running parallel to a longitudinal side of said rectangular shape, said second member including elongated strip portions extending from opposite sides of said rectangular shape in the direction of said slot for a distance such that at least one strip portion extends beyond the peripheries of said first and third members to facilitate sliding movement of said second member.

3. A navigational device comprising, in combination: a base member having compass readings in degrees about the peripheral portion of its surface and having hour numerals indicating times of the day in given positions relative to those corresponding compass readings in degrees designating the azimuth angle of the sun; a first transparent member of disc shape having a central opening and a first peripheral tab, said first member overlying said base member and having a first plurality of parallel lines across its surface; a second transparent member of rectangular shape overlying said first member and having a longitudinal slot running parallel to one side of said rectangular shape, said second transparent member having longitudinally extending strip portions to define an overall length of said second member greater than the diameter of said first member so that at least one of said strip portions extends beyond the peripheral edge of said first member; said second transparent member having a world map thereon and transverse parallel longitude lines oriented in accord with said world map; a third transparent member of disc shape having a central opening and a second peripheral tab, said third member overlying said second member and having a second plurality of parallel lines across its surface; and means passing through said central openings and slot to mount said first and third transparent members for rotation relative to said base member and said second transparent member of rectangular shape for sliding movement between said first and third members.

4. A device according to claim 3, in which said base member includes a chart on its surface oriented in accordance with said compass readings, said first and second plurality of parallel lines including division marks defining distance intervals corresponding to distances on said chart.

5. A course and distance finding navigation device comprising, in combination: a flat member having compass card indicia inscribed about the periphery of one surface and a navigation chart within said compass card indicia with true north on said chart in alignment with zero degrees on said compass card indicia; an overlying transparent member and cooperating resilient socket and center snap means for removably pivoting the center of said transparent member to said flat member for rotation, said transparent member having a plurality of straight parallel lines, one of said lines passing through the center of rotation of said transparent member so that said transparent member may be rotated while viewing said chart therethrough to substantially align one of said parallel lines with two points on said chart between which a trip is to be made, each of said plurality of straight parallel lines including evenly spaced division marks crossing the line at right angles and terminating short of the adjacent parallel lines to leave continuous clear spaces between said parallel lines, said division marks defining given distances therebetween so that the number of said division marks between said two points on said line in substantial alignment therewith indicates the distance between said points, the compass card indicia opposite the terminal point of said one of said lines passing through the center of rotation of said transparent member indicating the compass course between said points whereby both course and distance indications are provided by only a single rotative movement of said transparent member and whereby said transparent member may readily be removed and reused with different navigation charts; an additional transparent member overlying said first mentioned transparent member and having a plurality of parallel lines thereon, said additional transparent member being pivoted for rotation to said flat member whereby said first mentioned and additional transparent members may be rotated relative to said chart to align respective lines with radio stations to provide a fix on said chart at the intersection of said respective lines; and a sliding transparent member having a world map thereon sandwiched between said first and additional transparent members, said sliding member having an elongated slot through which said snap means pass to guide sliding movement of said member.

References Cited

UNITED STATES PATENTS

| | | | |
|---|---|---|---|
| 1,984,390 | 12/1934 | Wright | 33—76 |
| 2,007,986 | 7/1935 | Sprague | 33—1 |
| 2,114,652 | 4/1938 | Dalton | 33—1 |
| 2,235,177 | 3/1941 | Stark | 33—1 |
| 2,357,131 | 8/1944 | Putnam | 33—76 |
| 2,364,731 | 12/1944 | Luck | 33—1 |
| 2,546,836 | 3/1951 | Saloschin | 33—1 |
| 2,569,505 | 10/1951 | Thrash | 235—61 |
| 2,756,929 | 7/1956 | McGee | 235—61 |
| 3,094,781 | 6/1963 | Vangor | 33—1 |

FOREIGN PATENTS 123,886   1/1949   Sweden.

ROBERT B. HULL, *Primary Examiner.*